(12) United States Patent
Petratou

(10) Patent No.: US 11,376,886 B2
(45) Date of Patent: Jul. 5, 2022

(54) APPLICATOR DEVICE WITH AUTOMATIC RETRACTION

(71) Applicant: SOCIETE BIC, Clichy (FR)

(72) Inventor: Eirini Petratou, Paris (FR)

(73) Assignee: SOCIETE BIC, Clichy (FR)

( * ) Notice: Subject to any disclaimer, the term of this patent is extended or adjusted under 35 U.S.C. 154(b) by 28 days.

(21) Appl. No.: 17/016,129

(22) Filed: Sep. 9, 2020

(65) Prior Publication Data

US 2021/0094340 A1    Apr. 1, 2021

(30) Foreign Application Priority Data

Sep. 30, 2019  (EP) .................................... 19306217

(51) Int. Cl.
| | | |
|---|---|---|
| *B43K 21/027* | (2006.01) | |
| *B43M 11/06* | (2006.01) | |
| *C09J 9/00* | (2006.01) | |
| *A45D 40/06* | (2006.01) | |
| *A45D 40/18* | (2006.01) | |
| *A45D 40/12* | (2006.01) | |
| *B43K 23/016* | (2006.01) | |
| *B43K 24/06* | (2006.01) | |
| *A45D 40/00* | (2006.01) | |

(52) U.S. Cl.
CPC ............. *B43M 11/06* (2013.01); *A45D 40/06* (2013.01); *A45D 40/12* (2013.01); *A45D 40/18* (2013.01); *B43K 23/016* (2013.01); *B43K 24/06* (2013.01); *C09J 9/005* (2013.01); *A45D 2040/0006* (2013.01); *A45D 2040/0025* (2013.01); *A45D 2200/054* (2013.01)

(58) Field of Classification Search
CPC ......... B43M 11/06; C09J 9/005; A45D 40/06; A45D 40/12; A45D 40/18; A45D 2040/0006; A45D 2040/0025; A45D 2200/054; B43K 24/06; B43K 23/016
See application file for complete search history.

(56) References Cited

U.S. PATENT DOCUMENTS

| | | | | |
|---|---|---|---|---|
| 4,389,971 | A | 6/1983 | Schmidt | |
| 5,684,758 | A | 11/1997 | Gray et al. | |
| 7,629,757 | B2 * | 12/2009 | Murphy | ................. A45D 40/18 318/266 |
| 8,393,813 | B2 * | 3/2013 | Yarlagadda | ............ A45D 40/04 401/52 |

(Continued)

FOREIGN PATENT DOCUMENTS

DE         4223871 C1       8/1993

OTHER PUBLICATIONS

Extended European Search Report dated Mar. 27, 2020 in counterpart European Patent Application No. 19306217.1 (6 pages, in English).

*Primary Examiner* — Jennifer C Chiang
(74) *Attorney, Agent, or Firm* — Bookoff McAndrews, PLLC

(57) ABSTRACT

An applicator device for a product, said applicator device comprising a housing, a product carriage, for supporting the product, that is mobile within the housing between an extended state and a retracted position, and a retraction mechanism configured to move the product carriage into the retracted position after a predetermined period of time in the extended state. A glue stick comprising said applicator device and an adhesive product.

20 Claims, 3 Drawing Sheets

(56) References Cited

U.S. PATENT DOCUMENTS

| | | | | |
|---|---|---|---|---|
| 9,232,845 B2* | 1/2016 | Drugeon | ............ | A45D 40/18 |
| 9,908,140 B2* | 3/2018 | Arwatz | ............ | B65D 83/0011 |
| 2008/0025785 A1* | 1/2008 | Ma | ............ | A45D 40/06 |
| | | | | 401/87 |

* cited by examiner

APPLICATOR DEVICE WITH AUTOMATIC RETRACTION

CROSS REFERENCE TO RELATED APPLICATION(S)

This application claims priority to European Application No. EP19306217.1, filed on Sep. 30, 2019, the entire contents of which is incorporated herein by reference.

FIELD

The present disclosure relates to the field of applicator devices in which a product may be retracted within a housing of the applicator when not in use.

BACKGROUND ART

It is known to provide a user-drivable actuator for retracting the product within the applicator housing.

SUMMARY

It has been recognized that users may inadvertently allow a product in an applicator to extend beyond the housing when the applicator is not in use.

To address this problem, an applicator device according to examples of the present disclosure may be provided.

According to examples of the present disclosure, the applicator device is for a product. The applicator device comprises a housing. The applicator device comprises a product carriage for supporting the product. The product carriage is movable within the housing between an extended state and a retracted position. The applicator device comprises a retraction mechanism configured to move the product carriage into the retracted position after a predetermined period of time in the extended state. The applicator device is configured to generate a signal of the predetermined period of time.

The applicator device may allow for the product to be retracted within the housing automatically, rather than relying on a user to perform retraction.

The applicator device may comprise a closure. The closure may be configured to enclose the product within the housing when the product carriage is in the retracted position.

The applicator device may comprise actuator. The actuator may be configured to move the product carriage from the retracted position into the extended state.

The retraction mechanism may be configured to drive the actuator to move the product carriage into the retracted position.

The actuator may be drivable in a first direction to move the product carriage into the extended state, and drivable in a second direction, different from the first direction, to move the product carriage into the retracted position.

The applicator device may comprise retarding mechanism. The retarding mechanism may be configured to retard retraction of the product carriage in response to an application force on the applicator device meeting or exceeding a predetermined level.

The predetermined level may have a magnitude of 10N or less as measured along or oblique a retraction path of the product carriage, along which the product carriage may be movable from the extended state into the retracted position.

The retarding mechanism may comprise a brake. The brake may be engageable to retard retraction of the product carriage. The brake may be releasable to permit retraction of the product carriage.

The retarding mechanism may comprise a sensor that is configured to be triggered by the application force meeting or exceeding the predetermined level.

The predetermined period of time may vary in accordance with a user input.

The applicator device may comprise an indicator. The indicator may be configured to indicate a duration of the predetermined period of time.

The applicator device may be configured to generate the signal during measurement of the predetermined period of time. The applicator device may include a timer for measuring the predetermined period of time.

The applicator device may be configured to signal an ending of the predetermined period.

The retracted position may be relocatable with respect to the housing between a first location and a second location. The first location for the retracted position may be suitable for retracting a relatively small amount of product within the housing. The second location for the retracted position may be suitable for retracting a relatively large amount of product within the housing.

According to examples of the present disclosure, the applicator device may comprise the product. In examples, the product may be a glue stick.

Additionally or alternatively, according to examples of the present disclosure, a glue stick may be provided. The glue stick may comprise an applicator device as disclosed earlier herein and an adhesive product.

BRIEF DESCRIPTION OF THE DRAWINGS

The disclosure may be more completely understood in consideration of the following detailed description of aspects of the disclosure in connection with the accompanying drawings, in which.

Figure 1:
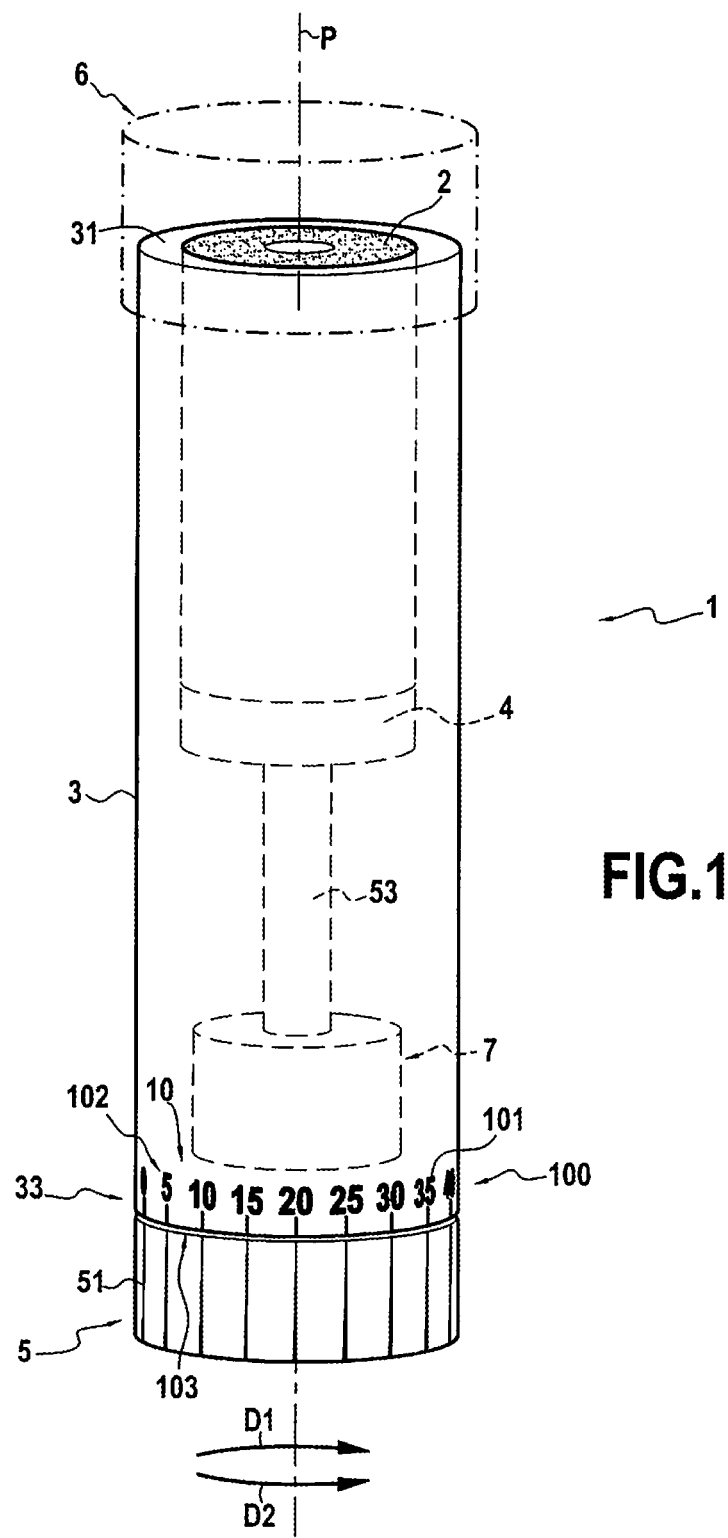
FIG. 1 shows a glue stick.

The term "exemplary" is used in the sense of "example," rather than "ideal." While aspects of the disclosure are amenable to various modifications and alternative forms, specifics thereof have been shown by way of example in the drawings and will be described in detail. It should be understood, however, that the intention is not to limit aspects of the disclosure to the particular embodiment(s) described. On the contrary, the intention of this disclosure is to cover all modifications, equivalents, and alternatives falling within the scope of the disclosure.

DETAILED DESCRIPTION

As used in this disclosure and the appended claims, the singular forms "a", "an", and "the" include plural referents unless the content clearly dictates otherwise. As used in this disclosure and the appended claims, the term "or" is generally employed in its sense including "and/or" unless the content clearly dictates otherwise.

The following detailed description should be read with reference to the drawings. The detailed description and the drawings, which are not necessarily to scale, depict illustrative aspects and are not intended to limit the scope of the disclosure. The illustrative aspects depicted are intended only as exemplary.

FIG. 1 shows an applicator device 1 according to the present disclosure. The applicator device 1 may comprise a product 2. The product 2 may be made to extend from the applicator device 1, for example for application of the product to a surface. The product 2 may be made to retract within the applicator device 1, for example between uses of the product.

The product 2 may include an adhesive product, as when the applicator device 1 is provided in a glue stick, for example. As a non-limiting example, the glue stick may be for stationary use. However, it is also contemplated to use a glue stick according to the present disclosure for use in other applications than stationary, such as construction and renovation for example. It is also contemplated to use other, possibly non-adhesive products with an applicator device 1 according to the description.

For example, the product 2 may include a cosmetic and/or dermatological composition (for example makeup and/or sunscreen, lipstick and/or lip balm, deodorant and/or antiperspirant, and the like) and/or other composition for application to the skin. For example, the product may include a maintenance composition such as a polish (for example shoe polish, furniture polish, floor polish, automotive polish, and the like) and/or a colorant (for example paint, correction material, pigment, dye, and the like). For example, the product may include a writing and/or drawing composition (for example one or more leads, colored waxes, chalks and the like).

Regardless of whether the product 2 is adhesive or non-adhesive, the product may be solid and/or gelatinous and/or a paste at room temperature. However, it is also contemplated to provide a product 2 which includes a composition that is liquid and/or fluid at room temperature and a porous delivery medium for suspending the liquid composition therein, for example.

The applicator device 1 comprises a housing 3, which may help to conceal the product 2 at least partially when it is retracted therein.

The housing 3 may be hollow, for example. Accordingly, several components located within the housing 3 are shown in dashed contours. The product 2 may be made to extend from and/or retract into the housing 3 through an open extremity 31 of the housing.

Although the housing 3 is represented in FIG. 1 as having a round tubular shape, non-round cross-sections are also contemplated. Moreover, although the housing 3 is represented in FIG. 1 as being substantially straight, curvilinear housings are also contemplated, for example.

Figure 2:
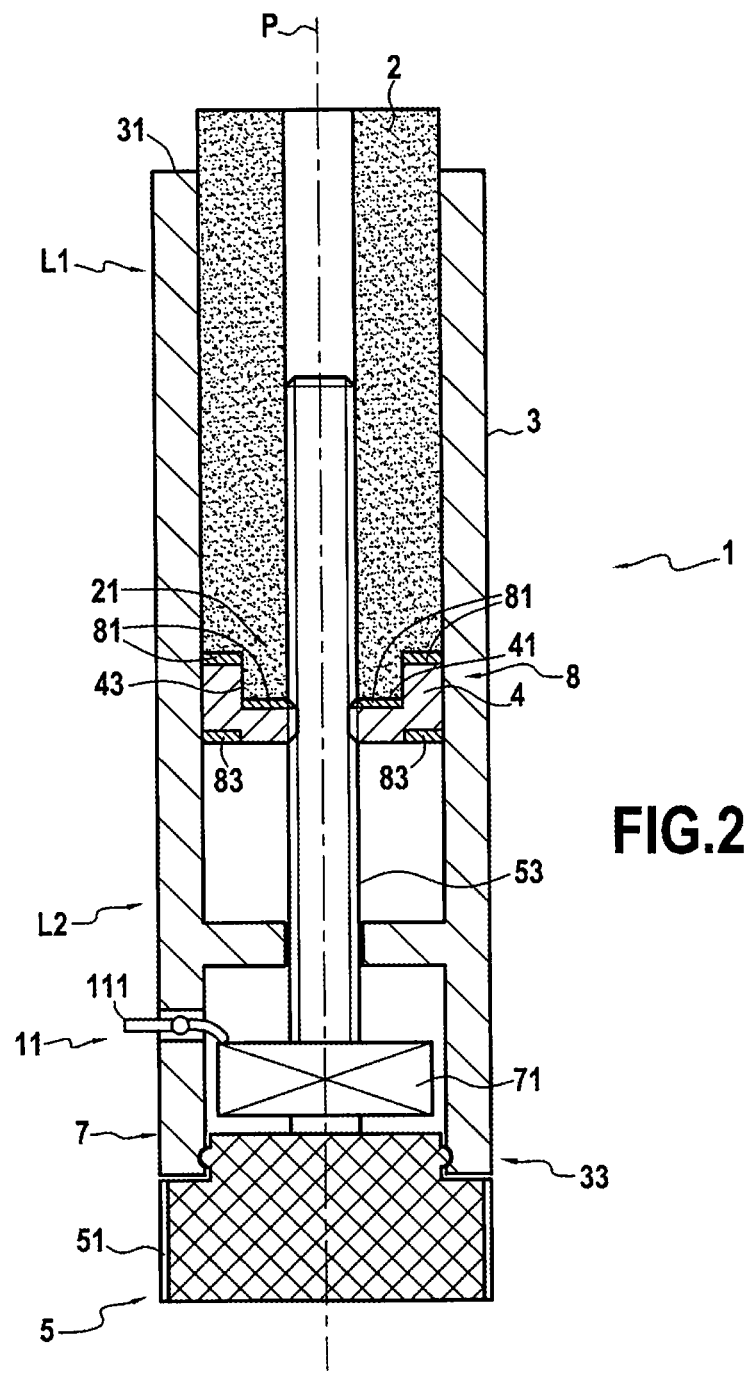
FIG. 2 shows a sectional view of an applicator device.

The applicator device 1 may comprise a product carriage 4 for supporting the product 2. As seen in FIG. 2, the product carriage 4 may, for example, comprise a surface 41 for contacting an extremity 21 of the product 2. This surface 41 may, for example, form part of a receptacle 43 of the product carriage 4, which may at least partially enclose the extremity 21 of the product 2.

The product carriage 4 may be mobile within the housing 3 between an extended state (FIG. 2) and a retracted position (FIG. 1). When the product carriage 4 is in the extended state, at least a portion of the product 2 (when present) may be made to extend from the applicator device 1 (for example from the open extremity 31 of the housing 3). When the product carriage 4 is in the retracted position, the product 2 (when present) may be located entirely within the housing 3.

As the product carriage 4 moves from the retracted position to the extended state, it may be made to move closer to the open extremity 31 of the housing 3 than when it was in the retracted position, for example.

As seen in FIG. 2, the applicator device 1 may comprise actuator 5. The actuator 5 may be configured to move the product carriage 4 from the retracted position into the extended state. The actuator 5 may, for example, allow for a user to move the product carriage 4. The actuator 5 may include, for example, a manually-driven actuator. For example, such an actuator may be provided as a knob 51 that is located near an extremity 33 of the housing 3 and that is mobile relative thereto. A user may, for example, twist the knob 51 relative to the housing 3 to drive the actuator. A screw thread 53 may be provided to convert the rotation of the knob 51 into translation for the product carriage 4.

Additionally or alternatively, as seen in FIG. 1, the actuator 5 may, for example, be drivable in a first direction "D1" to move the product carriage 4 into the extended state, and drivable in a second direction "D2", different from the first direction, to move the product carriage into the retracted position.

The term "retraction" as used in the present disclosure may be understood to describe movement of the product 2 (and/or product carriage 4) towards the retracted position. As such, it may be understood that retraction can occur at least in part even when the applicator device 1 is in an extended state.

The applicator device 1 may comprise closure 6. In FIG. 1, the closure 6 is represented as transparent with dot-dash contours to facilitate description of the product 2 and the housing 3. The closure 6 may be configured to enclose the product 2 within the housing 3 when the product carriage 4 is in the retracted position. The closure 6 may include a cap which may be disconnected from the housing 3 while the product is extended from the open extremity 31 of the housing, and/or a retractable cover which is configured to move into place automatically when the product carriage 4 is in the retracted position, for example.

For example, such a retractable cover may be connected to the housing 3 via a spring-loaded hinge to bias the retractable cover towards the open extremity 31 of the housing. When the product carriage 4 is in the extended state, the spring-loaded hinge may be overcome, for example by being pushed away from the open extremity 31 by the product carriage 4 and/or the product 2.

Additionally or alternatively, the applicator device 1 may comprise a retraction mechanism 7 configured to move the product carriage 4 into the retracted position after a predetermined period of time in the extended state. This may allow for the product 2 to be retracted within the housing 3 automatically, rather than relying on a user to perform retraction. Additionally or alternatively, this may encourage sharing of an applicator device 1 between multiple users (for example each predetermined period of time may correspond to a user's allotted use interval).

As seen in FIG. 2, the retraction mechanism 7 may, for example, be configured to drive the actuator 5 to move the product carriage 4 into the retracted position. This may be true regardless of whether a user is also able to drive the actuator 5 to perform retraction.

The applicator device 1 may comprise a retarding mechanism 8, configured to retard retraction of the product carriage 4 in response to an application force meeting or exceeding a predetermined level. The application force may be applied, for example to the product carriage 4, for example via the product 2.

For example, the retarding mechanism 8 may comprise a brake. The brake may be engageable to retard retraction of the product carriage 4. The brake may be releasable (for example under the action of a brake return spring) to permit retraction of the product carriage 4.

As a non-limiting example, the predetermined level may correspond to a stiffness of the brake return spring.

Additionally or alternatively, for example, the retarding mechanism 8 may comprise one or more pressure sensing modules 81. As an example, the pressure sensing module(s) 81 can be placed in between the product carriage 4 and product 2. The product 2 may transmit the application force to the pressure sensing module(s) 81. If the application force exceeds the predetermined level, then the pressure sensing module(s) 81 may mechanically transfer a command to the product carriage 4 to expand towards the housing 3 and increase friction therebetween so as to immobilize the product carriage within the housing.

Additionally or alternatively, the product carriage 4 may include one or more protrusions 83 which are configured to extend radially towards the housing 3 and/or screw thread 53 when the application force is detected to have exceeded the predetermined level so as to frictionally immobilize the product carriage 4 within the housing.

When the application force does not meet or exceed the predetermined level, the pressure sensing module 81 may stop the signal, allowing the retraction mechanism 7 to resume retraction. Regardless of how the retarding mechanism 8 is configured, immobilization of the product carriage 4 relative to the housing 3 may also cause the product carriage to be immobilized relative to the retraction mechanism.

The predetermined level for the application force may be set, for example, during manufacture of the applicator device 1.

The predetermined level may depend on a number of factors.

For example, the predetermined level may depend on an expected contact area between the product 2 and the surface to which it is applied. For example, an applicator device 1 for underarm deodorant (whose contact area may be on the order of 10 cm$^2$, for example) may be subjected to a higher application force than an applicator device 1 for applying lipstick (whose contact area may be on the order of 1 cm$^2$, for example).

As a non-limiting example, a glue stick may have a contact area on the order of 1 cm$^2$, or on the order of 10 cm$^2$, or between 1 cm$^2$ and 10 cm$^2$, or less than 1 cm$^2$, or more than 10 cm$^2$.

Additionally or alternatively, for example, the predetermined level may depend on the composition of the product 2. For example, a product 2 for a glue stick may be able to withstand greater stresses than a product 2 for a lipstick. Thus a predetermined level which is sufficient for an applicator device 1 for a glue stick may be excessive for an applicator device 1 for a lipstick of the same size, for example.

Additionally or alternatively, for example, the predetermined level may depend on an expected strength and/or coordination of the user. For example, an adult may be able to provide a greater application force than a child. In this regard, it may be possible, for example, for the predetermined level to be chosen so as to discourage use of the product 2 by a person who is unable to generate the necessary application force.

Additionally or alternatively, for example, a child may lack the coordination to avoid damaging the applicator device 1 and/or product 2 when applying the product to the surface. Thus, the retarding mechanism 8 may be further configured, for example, to reduce retardation of the retraction mechanism 7 if the application force exceeds a threshold beyond which damage to the applicator device 1 and/or product 2 may occur. When the retarding mechanism includes a brake, the brake may be configured, for example, to slip and/or to disengage when the threshold is surpassed.

Regardless of whether such a threshold is provided or not, the predetermined level may, for example, have a magnitude of 10N or less as measured along or oblique a retraction path "P" of the product carriage, along which the product carriage 4 may move from the extended state into the retracted position. For example, the magnitude of the predetermined level may be between 5N and 10N, or less than or equal to 5N. For example, the magnitude of the predetermined level may be between 3N and 5N, or less than or equal to 3N. For example, the magnitude of the predetermined level may be between 2N and 3N, or less than or equal to 2N. For example, the magnitude of the predetermined level may be between 1N and 2N, or less than or equal to 1N. For example, the magnitude of the predetermined level may be between 0.5N and 1N, or may be less than or equal to 0.5N.

Additionally or alternatively, the predetermined period of time may correspond to a user input. For example, the user input may include a displacement of the actuator 5. In this way, for example, a user may be able to vary and/or select the length of the predetermined period of time by displacing the actuator 5.

For example, the length of the predetermined period of time may correspond to the magnitude of the displacement of the actuator 5. For example, a user may be able to set a relatively short length of the predetermined period of time by providing a relatively small displacement of the actuator (for example by rotating the knob 51—when present—over a relatively small angle with respect to the housing 3), and a relatively long length of the predetermined period of time by providing a relatively large displacement of the actuator 5 (for example by rotating the knob—when present—over a relatively large angle with respect to the housing 3). For example, a user may be able to set a relatively short length of the predetermined period of time by actuating the actuator 5 so as to cause the product 2 to extend a relatively small distance beyond the open extremity 31 of the housing 3 (so that the interval of time between the onset of retraction and the moment when the product is located entirely within the housing is relatively short), and may be able to set a relatively long length of the predetermined period of time by actuating the actuator so as to cause the product to extend a relatively large distance beyond the open extremity of the housing (so that the interval of time between the onset of retraction and the moment when the product is located entirely within the housing is relatively long).

Additionally or alternatively, the applicator device 1 may be configured to provide a user with information related to the predetermined period of time. This information may be provided, for example, visually and/or audibly and/or haptically, for example.

The information may be provided, for example, in the form of a signal generated to inform a user that measurement of the predetermined period of time is ongoing, and/or by signaling the ending of the predetermined period of time. These signals may offer one or more benefits beyond conveying information related to the predetermined period of time.

For example, it/they may provide interaction with and/or entertainment for the user. Additionally or alternatively, for example, it/they may serve to remind the user of the availability of the applicator device 1 and/or to store the applicator device between uses. Additionally or alternatively, for example, they may facilitate sharing of the applicator device 1 between users by signaling the end of one user's turn (predetermined time period) to another, awaiting user, or to a supervisor of said users.

To signal the ending of the predetermined period of time, the applicator device 1 may be configured, for example, to emit one or more signals described above. For example, the applicator device 1 may comprise a light which can be made to turn on and/or off to signal the ending of the predetermined period of time. Additionally or alternatively, the applicator device 1 may comprise a beeper which can be made to beep one or more times to signal the ending of the predetermined period of time. Additionally or alternatively, the applicator device 1 may be configured to tick audibly and/or haptically one or more times to signal the ending of the predetermined period of time. Additionally or alternatively, the applicator device 1 may be configured to emit music to signal the ending of the predetermined period of time.

It is contemplated that signaling the ending of the predetermined period of time may be performed prior to the ending, simultaneously with the ending, and/or subsequent to the ending. For example, signaling the ending prior to the ending may warn a user that the ending is approaching; additionally or alternatively, signaling the ending simultaneously with the ending may help a user distinguish between proper and improper use and/or functioning of the applicator device 1; additionally or alternatively, signaling the ending subsequent to the ending may encourage storage and/or reuse of the applicator device 1.

A signal generated to inform a user that measurement of the predetermined period of time is ongoing may, for example, be periodic in nature. If the applicator device 1 is also configured to signal the ending of the predetermined time period, then the applicator device may, for example, be configured to provide at least one signal to signal the end of the predetermined period of time than was used to inform the user that measurement is ongoing, or vice versa, so that the user may be able to distinguish between the two types of information.

For example, as seen in FIG. 1, the applicator device 1 may comprise an indicator 10 that is configured to indicate a duration of the predetermined period of time. For example, the indicator 10 may provide an indication of how much time remains in the predetermined period of time, and/or an indication of how much time has elapsed since the predetermined period of time started, and/or of how far the product 2 extends beyond the open extremity 31 of the housing 3. The indication may be relative, for example.

As seen in FIG. 2, the applicator device 1 may include a timer 71 for measuring the predetermined period of time. The timer 71 may form part of the retraction mechanism 7, for example. The timer 71 may be a mechanical timer, for example. For example, as measurement of the predetermined period of time progresses, the timer 71 may move the product carriage 4 towards the retracted position. Alternatively, a non-mechanical timer may be used to control an electromechanical actuator that retracts the product carriage 4, for example.

When a mechanical timer is provided, immobilization of the product carriage 4 relative to the housing 3 (for example by the retarding mechanism 8) may also pause measurement of the predetermined period of time by the mechanical timer. Liberation of the product carriage 4 relative to the housing 3 may allow measurement of the predetermined period of time to resume.

The actuator 5 (when provided) may be connected to the timer 71. For example, a user may be able to set the duration of the predetermined period of time via the actuator 5 as s/he moves the product carriage 4 from the retracted position to the extended state. For example, the timer 71 may be connected to the housing 3 and to the knob 51 such that a rotation amount of the knob relative to the housing (for example in the direction D1, seen in FIG. 1) may drive the timer so as to set the duration of the predetermined period of time.

Additionally or alternatively, the timer 71 may drive the actuator 5 so as to move the product carriage 4 towards the retracted position, for example. For example, the timer 71 may be connected to the housing 3 and the screw thread 53, such that the timer may rotate the screw thread relative to the housing (for example in the direction D2, seen in FIG. 1) during measurement of the predetermined period of time so as to retract the product carriage 4.

The timer 71 may be configured to tick as it measures the predetermined period of time. This ticking may be used as at least part of the haptic and/or audible signal to indicate the progression of the predetermined period of time.

Additionally or alternatively, the timer 71 may be configured to move a weighted element to signal the ending of the predetermined period of time. This movement may, for example, provide haptic signaling of the ending. Additionally or alternatively, this movement may provide auditory signaling of the ending, for example by striking against another object of the timer, such as a chime.

Returning now to FIG. 1, the indicator 10 (when provided) may include a scale 100 and an indicator 103 mobile relative thereto. One of the scale 100 and the indicator 103 may be provided on a surface of the housing 3 that is visible to the user, for example, and the other of the scale and the indicator may be provided so as to indicate a first portion 101 of the scale at the beginning of the predetermined period of time, and a second portion 102 of the scale subsequent thereto (for example when the product carriage 4 reaches the retracted position).

For example, the indicator 100 and scale 103 may be provided on the housing 3 and knob 51, such that the movement of the knob when driven by the timer may cause the movement of the scale and indicator relative to each other.

As mentioned earlier, a user may be able to drive the actuator 5 to move the product carriage 4 into the retracted position, even if the retraction mechanism 7 are also configured to drive the actuator to perform retraction. When a mechanical timer is present, the user may be able to do this, for example, by driving the actuator 5 in the same direction as they are being driven by the timer so that the timer is overdriven towards a zero position (corresponding to the end of the predetermined period of time).

Additionally or alternatively, as seen in FIG. 2, the device may comprise shifter 11 configured to select one or more operating modes of the applicator device 1.

For example, an operating mode may be provided in which the retraction mechanism 7 are deactivated, such that automatic retraction does not occur in this mode. In this mode, a user may, for example, be able to obtain retraction by driving the actuator 5 in the second direction D2, for example.

For example, the shifter 11 may be configured to disconnect the timer 71 from the housing 3 to deactivate the retraction mechanism 7. For example, the timer 71 may rotate with the knob 51 relative to the housing 3 when the retraction mechanism 7 are deactivated. For example, the shifter 11 may include a coupling 111 which is disengageable to disconnect the timer 71 from the housing 3.

Deactivating the retraction mechanism 7 may allow a user to relocate the retracted position relative to the housing 3, for example to accommodate for variations over time in the amount of product 2 contained in the applicator device 1 (for example a decrease in product 2 quantity as with use and/or aging of the product, and/or an increase in product quantity as with re/loading an applicator device).

For example, the user may relocate the retracted position with respect to the housing 3 between a first location L1 and a second location L2 by moving the product carriage 4 between these locations while the retraction mechanism 7 are deactivated. The first location L1 for the retracted position may be suitable for retracting a relatively small amount of product 2 within the housing 3. The second location L2 for the retracted position may be suitable for retracting a relatively large amount of product 2 within the housing 3. In this way, it may, for example, be possible to adjust the location of the retracted position as the amount of product 2 in the application device 1 changes.

The first L1 and second L2 locations may correspond to locations within the housing 3, such that the first location is between the second location and the open extremity 31 of the housing.

For example, when the product 2 is unused, the retracted position may be in the second location L2. As the amount of product 2 in the application device 1 decreases (for example as a result of use and/or aging) the retracted position may be relocated towards (or even to) the first location L1. Moreover, if the amount of product 2 increases (for example as with reloading of the applicator device 1 with a new supply of product), the retracted position may be relocated towards (or even to) the second location L2.

When a user is able to modify the location of the retracted position, and the duration of the predetermined period of time corresponds to a user input, it may be understood that this input may include, for example, the location of the retracted position. Once the user has relocated the retracted position, s/he may be able to reactivate the retraction mechanism 7 using the shifter 11, and set a duration for the predetermined period of time by moving the product carriage 4 with respect to the newly-relocated retracted position, for example.

Figure 3:
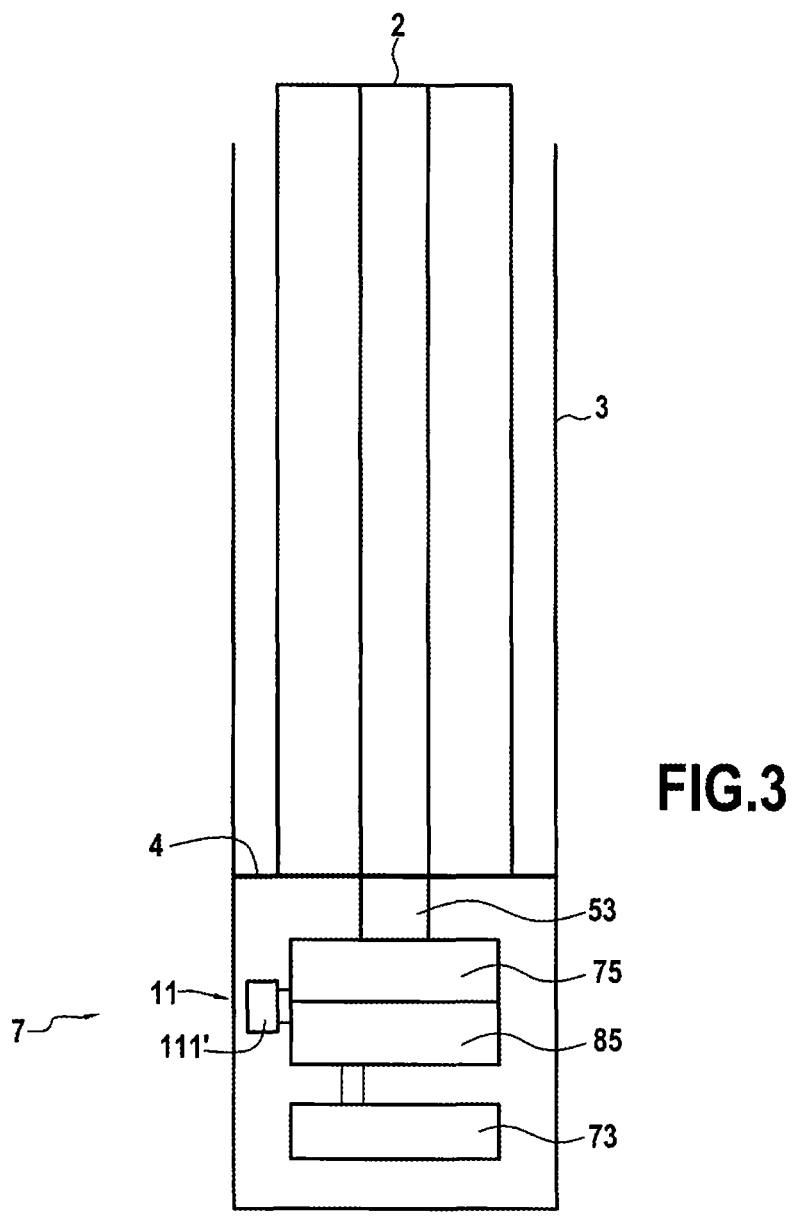
FIG. 3 shows a schematic representation of a sectional view of an applicator device.

FIG. 3 shows a variant of the applicator device 1 shown in FIG. 2.

The retraction mechanism 7 may, for example, include an electric motor 75 to move the product carriage 4 relative to the housing 3. The electric motor 75 may be activated in response to an electrical signal controlled (and/or sent) by a timer.

The timer may, for example, be an electric timer 73, as seen in FIG. 3, however it is also contemplated for a mechanical or electromechanical timer to control the electric motor 75.

The retarding mechanism 8 (when present) may include a sensor 85, for example. When triggered (for example by the application force as described earlier herein), the sensor may cause the electric timer 73 to pause, for example.

Additionally or alternatively, the sensor 85 may prevent the electric motor 75 (when present) from being activated by the electric timer 73, for example. For example, the sensor may be configured to disconnect the electric motor from the timer when triggered.

The shifter 11 (when present) may, for example be provided as a switch 111' which activates and/or deactivates the electric motor 75 (when present) and/or the sensor 85 (when present) and/or the electric timer 73 (when present).

Although the described embodiments were provided as different exemplary embodiments, it is envisioned that these embodiments are combinable or, when not conflicting, the features recited in the described embodiments may be interchangeable. Moreover, the features recited in the described embodiments are not inextricably linked to one another, unless such a linkage is clearly indicated between two given features.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An applicator device for a product, the applicator device comprising:
   a housing,
   a product carriage for supporting the product, that is mobile within the housing, between an extended state and a retracted position,
   a retraction mechanism configured to move the product carriage into the retracted position after a predetermined period of time in the extended state, and
   a retarding mechanism configured to retard retraction of the product carriage in response to an application force on the applicator device meeting or exceeding a predetermined level, wherein the applicator device is configured to generate a signal of the predetermined period of time.

2. The applicator device of claim 1, comprising a closure configured to enclose the product within the housing when the product carriage is in the retracted position.

3. The applicator device of claim 1, comprising an actuator configured to move the product carriage from the retracted position into the extended state.

4. The applicator device of claim 3, wherein the retraction mechanism is configured to drive the actuator to move the product carriage into the retracted position.

5. The applicator device of claim 3, wherein the actuator is drivable in a first direction to move the product carriage into the extended state, and drivable in a second direction that is different from the first direction, to move the product carriage into the retracted position.

6. The applicator device of claim 1, wherein the predetermined level has a magnitude of 10N or less as measured along or oblique a retraction path of the product carriage, along which the product carriage is movable from the extended state into the retracted position.

7. The applicator device of claim 1, the retarding mechanism comprising a sensor that is configured to be triggered by the application force meeting or exceeding the predetermined level.

8. The applicator device of claim 1, wherein a length of the predetermined period of time varies according to a user input.

9. The applicator device of claim 1, comprising an indication means configured to indicate a duration of the predetermined period of time.

10. The applicator device of claim 1, wherein the applicator device is further configured to signal an ending of the predetermined period of time.

11. The applicator device of claim 1, the retracted position being relocatable with respect to the housing between a first location that is suitable for retracting a relatively small amount of product within the housing, and a second location that is suitable for retracting a relatively large amount of product within the housing.

12. The applicator device of claim 1, comprising the product, the product being a stationery glue stick.

13. A stationery glue stick comprising an applicator device according to claim 1 and an adhesive product.

14. The applicator device of claim 1, further comprising a shifter configured to select one or more operating modes of the applicator device.

15. The applicator device of claim 1, wherein the retarding mechanism comprises a brake.

16. The applicator device of claim 15, wherein the brake is engageable to retard retraction of the product carriage and is releasable to permit retraction of the product carriage.

17. The applicator device of claim 1, further comprising a timer for generating the signal of the predetermined period of time, wherein the timer is connected to the housing such that the timer can rotate relative to the housing during measurement of the predetermined period of time.

18. The applicator device of claim 1, further comprising a timer for generating the signal of the predetermined period of time, wherein the timer is configured to tick as it measures the predetermined period of time to indicate a progression of the predetermined period of time.

19. An applicator device for a product, the applicator device comprising:
    a housing,
    a product carriage for supporting the product, that is mobile within the housing, between an extended state and a retracted position,
    a retraction mechanism configured to move the product carriage into the retracted position after a predetermined period of time in the extended state, and
    a timer for generating a signal of the predetermined period of time.

20. An applicator device for a product, the applicator device comprising:
    a housing,
    a product carriage for supporting the product, that is mobile within the housing, between an extended state and a retracted position,
    a retraction mechanism configured to move the product carriage into the retracted position after a predetermined period of time in the extended state, and
    a shifter configured to select one or more operating modes of the applicator device, wherein the applicator device is configured to generate a signal of the predetermined period of time.

* * * * *